United States Patent
Wen

(10) Patent No.: US 8,448,669 B2
(45) Date of Patent: May 28, 2013

(54) TUBE FOR CABLE SHEATH AND CABLE SHEATH USING THE SAME

(76) Inventor: Yuan-Hung Wen, Chang Hua County (TW)

( * ) Notice: Subject to any disclaimer, the term of this patent is extended or adjusted under 35 U.S.C. 154(b) by 0 days.

(21) Appl. No.: 13/235,424

(22) Filed: Sep. 18, 2011

(65) Prior Publication Data

US 2013/0068341 A1    Mar. 21, 2013

(51) Int. Cl.
    *F16L 11/00*    (2006.01)

(52) U.S. Cl.
    USPC .......................................... 138/120; 138/119

(58) Field of Classification Search
    USPC .................................................. 138/119, 120
    See application file for complete search history.

(56) References Cited

U.S. PATENT DOCUMENTS

| | | | |
|---|---|---|---|
| 338,310 A * | 3/1886 | Smith | 138/110 |
| 428,023 A * | 5/1890 | Schoff | 138/120 |
| 445,250 A * | 1/1891 | Lawless | 138/120 |
| 1,001,842 A * | 8/1911 | Greenfield | 285/266 |
| 1,276,117 A * | 8/1918 | Riebe | 464/171 |
| 1,485,394 A * | 3/1924 | Haynes | 138/134 |
| 1,695,263 A * | 12/1928 | Jacques | 138/120 |
| 1,963,368 A * | 6/1934 | Johnson | 285/264 |
| 5,069,486 A * | 12/1991 | Kimura et al. | 285/154.2 |
| 5,254,809 A * | 10/1993 | Martin | 174/68.1 |
| 5,839,476 A * | 11/1998 | Blase | 138/120 |
| 6,042,155 A * | 3/2000 | Lockwood | 285/264 |
| 6,648,376 B2 * | 11/2003 | Christianson | 285/146.1 |
| 2002/0117229 A1* | 8/2002 | Luettgen et al. | 138/DIG. 8 |
| 2005/0103903 A1* | 5/2005 | Shamir et al. | 239/587.2 |

* cited by examiner

*Primary Examiner* — James Hook

(57) ABSTRACT

The present invention is to provide a tube for cable sheath and the cable sheath using the same. The front end of each tube is connected to the rear end of another one. Two side plates are connected to another tube. A cable is received in the cable sheath. Thereby, when a brake cable is received in the cable sheath, the side plates are connected to another tube so as to restrict one of the bending direction degree of the cable that can avoid the cable sheath being bended in all direction. It is important that the side plates can protect the connecting point of each tube quite well and enhance the structure intensity of the whole cable sheath. After standardizing the specification of the present invention, it can be connected to many kinds of products. The present invention has abundant variability and achieves the best efficacy.

6 Claims, 4 Drawing Sheets

TUBE FOR CABLE SHEATH AND CABLE SHEATH USING THE SAME

BACKGROUND OF THE INVENTION

1. Field of the Invention

The present invention relates to a cable sheath which is used for a cable to be received therein.

2. Description of the Prior Art

Cable sheaths are not only used for a brake cable or the like to be received therein, but protect the cable or users well.

Conventional cable sheath, as shown in U.S. Pat. No. 338,310, includes a plurality of circular tubes which are respectively formed with a tenon on the tube wall. The tubes are connected to one another by the tenons, thereby the bending degree of the cable and the cable sheath are restricted. However, each tube has four tenons, when each tube is connected to one another, many bending directions of the cable sheath would be restricted. When the bending directions and the bending angles of the cable sheath are limited strictly, it would lose the original design purpose of the cable sheath—provide proper bending directions for the cable. Besides, the conventional cable sheath doesn't dispose any fixed structure so that each tube easily slides away from one another.

Another conventional cable sheath, as shown in U.S. Pat. No. 5,933,577, are made of plural main tubes and plural joint tubes in combination. The bending directions of the tubes are restricted by fixed structures on the side of the tubes so that the sheath may bend in only one direction. However, the conventional cable sheath must be made of the main tubes and the joint tubes so as to accomplish the said function; moreover, the whole sheath can be restricted in only one bending direction. Besides, the fixed structures are difficultly dismantled and installed. As above, the conventional cable sheath is inconvenient and lack of variability.

Furthermore, the current merchandises of cable sheaths in the market, including the said prior arts, have a problem in common—the structure of the connecting point of each tube is fragile and easy to be damaged by external force. The conventional cable sheaths don't have any structure can protect the connecting point from being damaged so as to cause their life to be shortened and substitute for a new one often. In other words, all prior arts can't provide a good stability of use.

In addition, when the brake cable is actually received in the cable sheath, in other to the brake cable may bend smoothly, some parts of the brake cable usually require larger space for bending, while the others don't have too many curves. However, the said prior arts don't enable the users to determine the bending sections of the cable sheath for the brake cable as needed.

SUMMARY OF THE INVENTION

The main object of the present invention is to provide a tube for cable sheath which is used for the brake cable or the like to be received directly.

To achieve the above, the tube for cable sheath of the present invention includes a front end, a rear end, and two side plates. The tube is formed with a hollow cylinder, a hollow abutting section, and a receiving space from the front end to the rear end in turn. The side plates parallel with each other are protrusive from the abutting section along an extension direction of the front end. A clamping space is formed between each of the side plates and the cylinder which has a protrusive rim adjacent to an opening of the cylinder. The protrusive rim extends away from the cylinder radially. An inner diameter of the receiving space narrows down gradually toward the opening of the receiving space. A minimal inner diameter of the receiving space is defined in the opening. A maximal outer diameter of the protrusive rim is smaller than a maximal inner diameter of the receiving space. An outer diameter of the protrusive rim is larger than the minimal inner diameter of the receiving space. An outer diameter of the cylinder is smaller than the minimal inner diameter of the receiving space. The abutting section has two abutting surfaces which are parallel and corresponding to each other. The side plates are parallelly protrusive from the abutting surfaces along the extension direction of the front end. A distance between inner sides of the side plates is longer than a distance between the abutting surfaces. Thereby each of the side plates is connected to the relative abutting surface so as to form with a continuous surface which shapes in the form of steps. Two abutting portions are respectively formed between one of the side plates and one of the abutting surfaces. A distance from the end of the side plate to the abutting portion is shorter than a distance from the opening of the receiving space to the abutting portion.

Thereby the clamping spaces of the side plates of the tube are adapted for an outside of the abutting section of another tube being clutched therein. The cylinder of the tube is received into the receiving space of another tube revolvingly. Each tube is connected to another one in turn so as to define a hollow column therein.

As such, the hollow column is adapted for the cable to be received therein. The column is restricted its bending direction by the side plates and the abutting sections which are connected to each other so that the column may bend in only one direction along an extension direction of the abutting surfaces. In other words, there is only one larger bending space for the column in a vertical direction of the extension direction of the abutting surfaces so that the column may avoid the cable being bended in all directions randomly. It is important that the side plates protect the fragile connecting point of the tube so that it might not be damaged by external force, and the side plates and the abutting surfaces can pile together to enhance the structural intensity of the tube.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
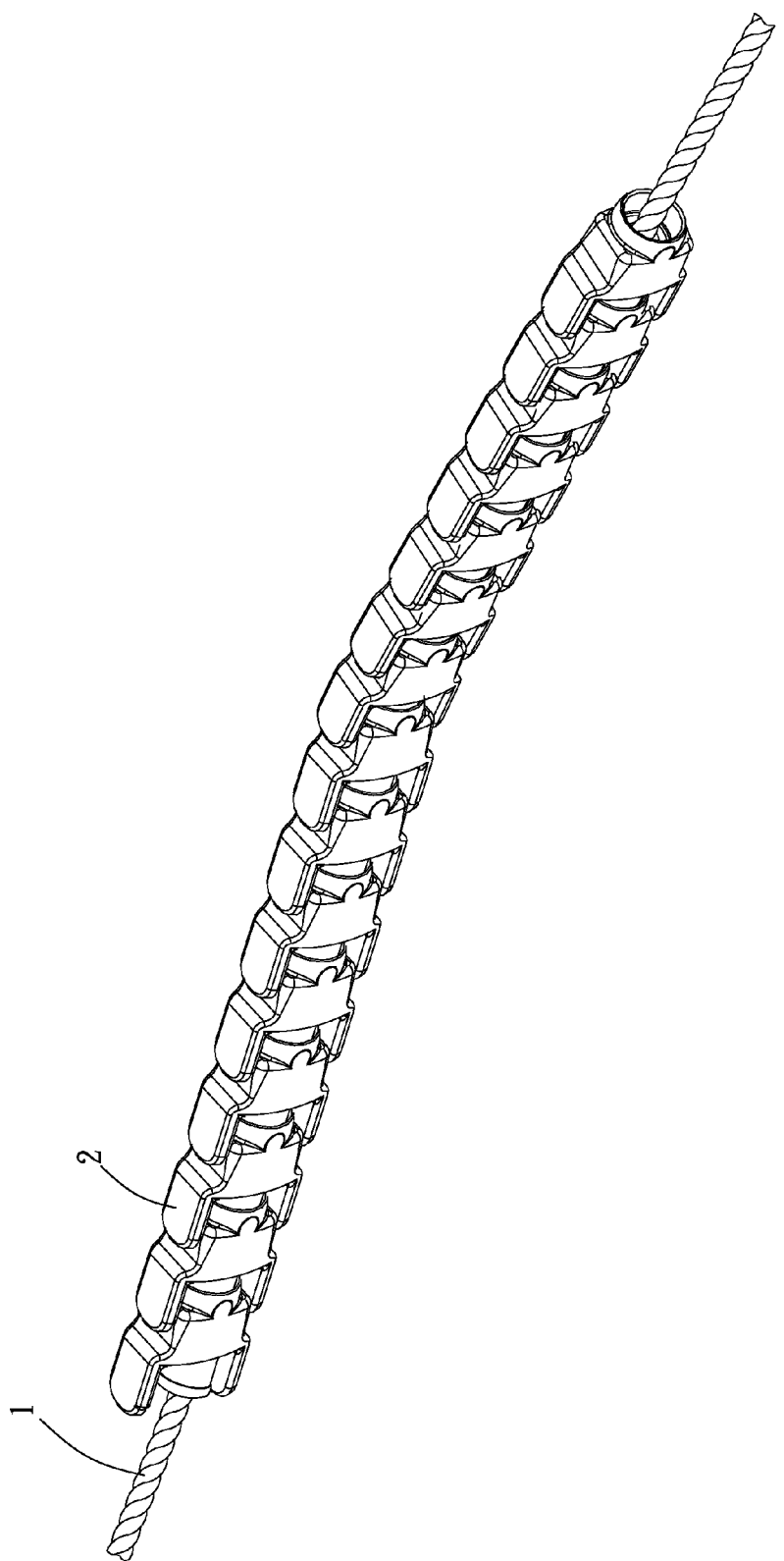
FIG. 1 is a stereogram of the present invention.

Please refer to the FIG. 1, the cable sheath of the present invention comprises plural tubes 2 which are connected to one another in turn. A cable 1 is received in the cable sheath. Each tube 2 has a front end, a rear end, and two side plates 24.

Figure 3:
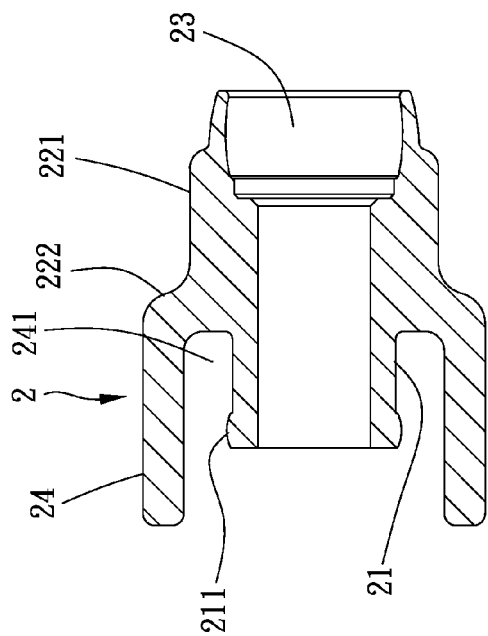
FIG. 3 is a side perspective view showing a single tube of the present invention.
Figure 2:
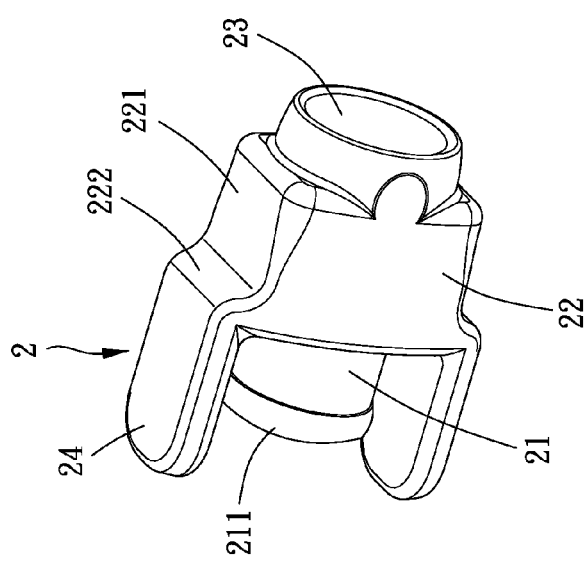
FIG. 2 is a stereogram showing a single tube of the present invention.

Please refer to FIG. 2 and FIG. 3, each tube is formed with a hollow cylinder 21 and a hollow abutting section 22 from the front end to the rear end in turn. The rear end is formed with a receiving space 23. The receiving space 23 has an opening. The side plates 24 parallel with each other are protrusive from the abutting section 22 along an extension direction of the front end. The cylinder 21 has a protrusive rim 211 adjacent to an opening of the cylinder 21. The protrusive rim 211 extends away from the cylinder 21 radially. An inner diameter of the receiving space 23 narrows down gradually toward the opening of the receiving space 23. A minimal inner diameter of the receiving space 23 is defined in the opening. A maximal outer diameter of the protrusive rim 211 is smaller than a maximal inner diameter of the receiving space 23. An outer diameter of the protrusive rim 211 is larger than the minimal inner diameter of the receiving space 23. An outer diameter of the cylinder 21 is smaller than the minimal inner diameter of the receiving space 23. Thereby, when the tubes are connected to one another, they can be fixed together and be separated difficulty, they still have enough space for rotation and keeping the possibility of bending. In another embodiment, the inner diameter of the receiving space 23 doesn't narrow down gradually toward the opening of the receiving space 23. The receiving space 23 has an engaging rim near the opening of the receiving space 23. The outer diameter of the cylinder 21 is smaller than the inner diameter of the engaging rim so that the tubes 2 may be connected to one another. The abutting section 22 has two abutting surfaces 221 which are parallel and corresponding to each other. The side plates 24 are parallelly protrusive from the abutting surfaces 221 integrally along the extension direction of the front end. The side plates 24 are parallel with the abutting surfaces 221. A clamping space 241 is formed between each of the side plates 24 and the cylinder 21. A distance between inner sides of the side plates 24 is longer than a distance between the abutting surfaces 221. Thereby, each of the side plates 24 is connected to the relative abutting surface 221 so as to form with a continuous surface which shapes in the form of steps. Two abutting portions 222 are respectively formed between one of the side plates 24 and one of the abutting surfaces 221. A distance from the end of the side plate 24 to the abutting portion 222 is shorter than a distance from the opening of the receiving space 23 to the abutting portion 222 so as to remain some space to be adapted for each tube revolving. Wherein, in another embodiment, the side plates 24 are non-parallel, but still symmetrical so that the tubes 2 may be connected to another one. For instance, the distance between the side plates 24 toward the front end broadens gradually so that the side plates 24 are radial, and the distance between the abutting surfaces toward the rear end narrows down gradually so that the shape of the abutting section may still correspond to the shape of the side plates. Besides, the side plates can also be fixed on the outer surface of another tube with different manners, such as an encasing means or other installation means.

Figure 4:
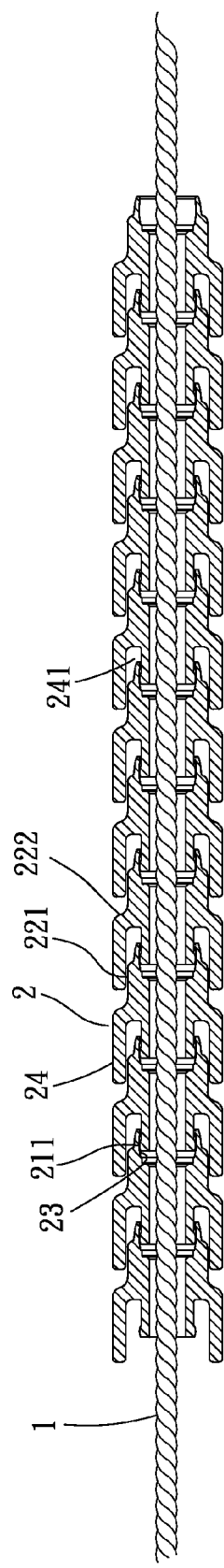
FIG. 4 is a side perspective view of the present invention.

When the tubes are in the process of installing, as shown in FIG. 4, the front end of a first tube is connected to the rear end of a second tube, the clamping space 241 of the side plates 24 of the first tube are adapted for the abutting surfaces 221 of the second tube are clutched therein, and the cylinder 21 of the first tube is received into the receiving space 23 of the second tube inclinedly. The tubes can be connected to one another with the said manner in turn so as to define a hollow column-formed cable sheath which can be bended partially. Whereby the present invention is used for the cable 1 being received therein and achieves preferably bending-limited effect. When the brake cable is received into the cable sheath, the cable sheath and the brake cable can be bended upward in a particular direction only, thereby reducing the inconvenience of use, and be installed and dismantled easily. The present invention is quite useful.

Figure 5:
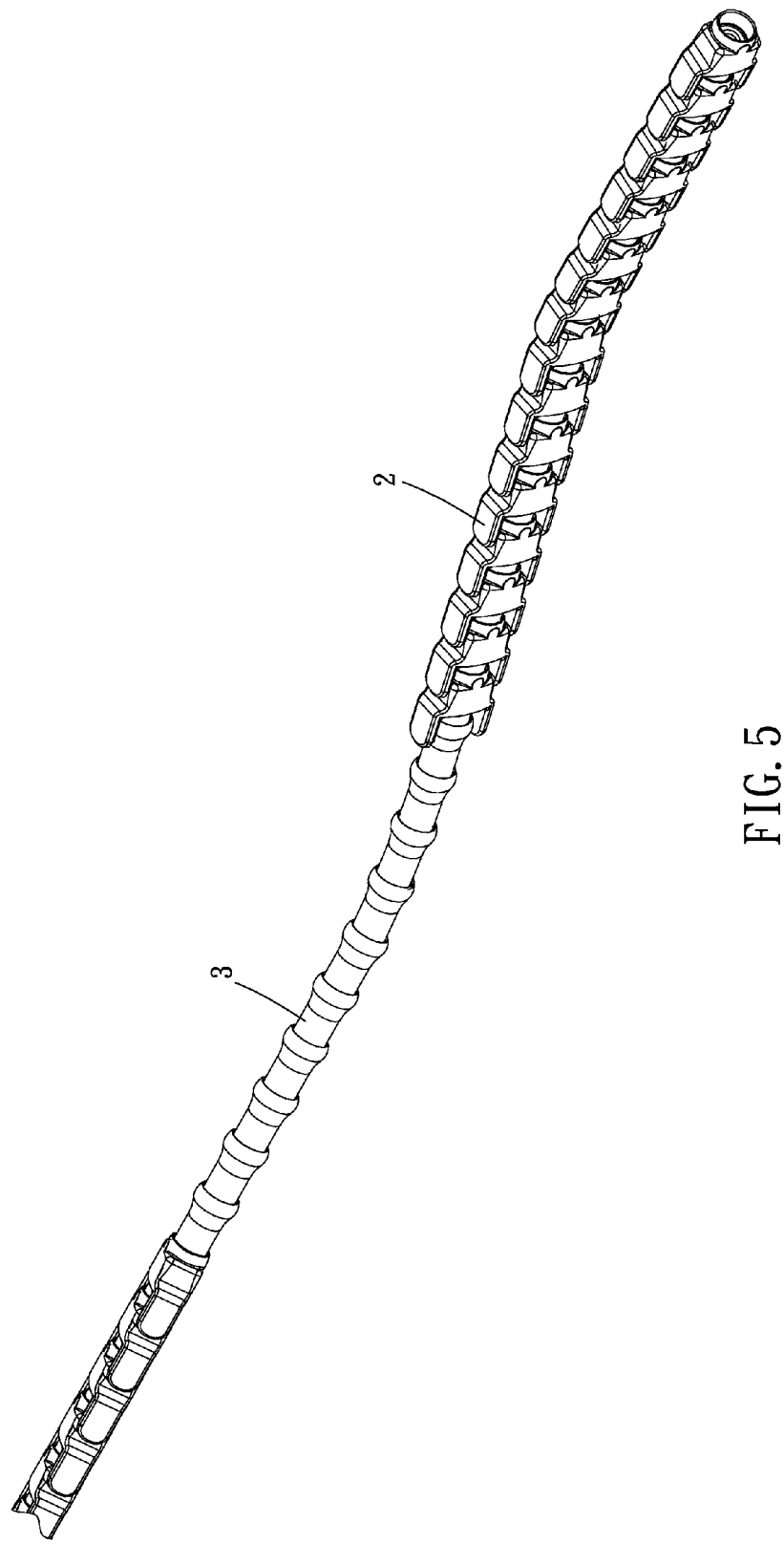
FIG. 5 is a stereogram in accordance with the second embodiment of the present invention.

In a second embodiment, as shown in FIG. 5, the cable sheath can also comprise several kinds of tubes. More specifically speaking, as long as the tubes which are hollow have the same size of the cylinder 21 and the receiving space 23, they could be connected to the tube 2 of the present invention. For instance, the cable sheath comprises plural non-side plate tubes 3 and the tubes 2. The non-side plate tubes 3 are connected to the tubes 2 so that the cable sheath may have lots of different sections which provide different effects for restricting its bending degree. Moreover, because the present invention is easy to be installed and dismantled, the non-side plate tubes 3 are disposed in some sections which have many curves, and the tubes 2 are disposed in some sections which don't have too many curves. As result in, the present invention can be adjusted as the users needed.

The said cable is covered by an outer plastic cap; however, in other possible embodiments of the present invention, the cable sheath of the present invention further comprises a plurality of inner plastic caps corresponding to the inner cavity of the tubes 2. For example, each tube 2 has several portions which are different between their inner diameter. The inner diameter of some portions of each tube 2 near the front end is smaller, the inner diameter of other portions of each tube 2 near the rear end is larger, a step-formed abutting zone is formed between the different inner diameter portions of each tube 2 so that the inner plastic cap can be received therein from the end of each tube 2. In other words, the present invention is adapted for the cable which isn't covered by the outer plastic cap being received therein; thereby the present invention has a good variability of use.

It is important that the side plates make the connecting point hidden completely so that the side plates can protect the connecting point well. When the sheath is bended, one side of the side plates is most fragile, the side plates just provide the best protection for the connecting point.

According to description mentioned above, the present invention can achieve the below:

Firstly, the present invention is used for the users preferably controlling the bending direction of the cable sheath and the cable, such as the brake cable, in the more ideal positions, thereby, the present invention is quite useful.

Secondly, the side plates protect the connecting point which is more fragile from being damaged and enhance the structure intensity of the cable sheath.

Thirdly, the present invention has convenience and variability of use and sale in business. After standardizing the specification of the present invention, it can be connected to many kinds of products. The different sections of the cable sheath is used for disposing different products as needed so that the present invention can achieve the best efficacy.

What is claimed is:

1. A tube for cable sheath having a front end, a rear end, and two side plates, the tube being formed with a hollow cylinder and a hollow abutting section from the front end to the rear end in turn, the rear end being formed with a receiving space, the receiving space having an opening, the side plates being protrusive from the abutting section along an extension direction of the front end, a clamping space being formed between each of the side plates and the cylinder;

wherein the clamping spaces of the side plates of the tube are adapted for an outside of the abutting section of another tube being clutched therein, the cylinder of the tube is received into the receiving space of another tube revolvingly;

wherein the side plates are separately located on two opposite side of the tube, two opposite side portions of the rear end of one the tube is permanent at least partially located between either of the side plates and the cylinder of another adjacent tube when the adjacent tubes are connected together with their respective axes being coaxial or non-coaxial;

wherein when the adjacent tubes are connected together, an inner circumferential surface of the rear end of one the tube engages with an outer circumferential surface of the cylinder of another adjacent tube, and the rear end of one the tube overlays the cylinder by over an half of the entire length of the cylinder of another adjacent tube;

wherein as one of the two opposite side portions of one the rear end is abutted against the cylinder and one of the two side plates of another adjacent tube to position the two adjacent tubes at a fixed angle, the other opposite side portions is abutted against the cylinder and the other side plate of the adjacent tube.

2. The tube for cable sheath of claim 1, the cylinder having a protrusive rim adjacent to an opening of the cylinder, the protrusive rim extending away from the cylinder radially, an inner diameter of the receiving space narrowing down gradually toward the opening of the receiving space, a minimal inner diameter of the receiving space being defined in the opening, a maximal outer diameter of the protrusive rim being smaller than a maximal inner diameter of the receiving space, an outer diameter of the protrusive rim being larger than the minimal inner diameter of the receiving space, an outer diameter of the cylinder being smaller than the minimal inner diameter of the receiving space.

3. The tube for cable sheath of claim 1, the abutting section having two abutting surfaces, the abutting surfaces being parallel and corresponding to each other, the side plates being parallelly protrusive from the abutting surfaces along the extension direction of the front end, the side plates being parallel with the abutting surfaces.

4. The tube for cable sheath of claim 3, a distance between inner sides of the side plates being longer than a distance between the abutting surfaces, thereby each of the side plates is connected to the relative abutting surface so as to form with a continuous surface which shapes in the form of steps, two abutting portions are respectively formed between one of the side plates and one of the abutting surfaces.

5. The tube for cable sheath of claim 4, a distance from the end of the side plate to the abutting portion being shorter than a distance from the opening of the receiving space to the abutting portion.

6. A cable sheath, comprising plural tubes for cable sheath of claim 1, the front end of each tube being connected to the rear end of another one so as to define a hollow column therein.

* * * * *